US006951190B2

(12) United States Patent
Northrop et al.

(10) Patent No.: US 6,951,190 B2
(45) Date of Patent: Oct. 4, 2005

(54) SELF-CLEANING LITTER BOX

(75) Inventors: Melaney Northrop, Cleburne, TX (US); Mike Harper, Fort Worth, TX (US); Larry Weinberg, Rogue River, OR (US)

(73) Assignee: Doskocil Manufacturing Company, Inc., Arlington, TX (US)

(*) Notice: Subject to any disclaimer, the term of this patent is extended or adjusted under 35 U.S.C. 154(b) by 0 days.

(21) Appl. No.: 10/372,489

(22) Filed: Feb. 21, 2003

(65) Prior Publication Data

US 2003/0217700 A1 Nov. 27, 2003

(Under 37 CFR 1.47)

Related U.S. Application Data

(60) Provisional application No. 60/373,435, filed on Apr. 18, 2002.

(51) Int. Cl.[7] ................................................ A01K 29/00
(52) U.S. Cl. ....................................................... 119/166
(58) Field of Search ................................. 119/161, 165, 119/166

(56) References Cited

U.S. PATENT DOCUMENTS

| | | | | |
|---|---|---|---|---|
| 2,963,003 A | | 12/1960 | Oberg et al. | |
| 4,574,735 A | | 3/1986 | Hohenstein | |
| 5,048,463 A | | 9/1991 | Wilson et al. | |
| 5,048,465 A | | 9/1991 | Carlisi | |
| 5,477,812 A | | 12/1995 | Waters | |
| 5,564,364 A | * | 10/1996 | Kovacs et al. | 119/165 |
| 5,622,140 A | * | 4/1997 | McIlnay-Moe | 119/166 |
| 5,755,181 A | * | 5/1998 | Petkovski | 119/165 |
| 5,794,566 A | | 8/1998 | Goetz et al. | |
| 5,931,119 A | | 8/1999 | Nissim et al. | |
| 6,082,302 A | | 7/2000 | Thaler et al. | |
| RE36,847 E | | 9/2000 | Waters | |
| 6,202,595 B1 | * | 3/2001 | Atcravi | 119/165 |
| 6,205,954 B1 | | 3/2001 | Bogaerts | |
| 6,286,459 B1 | | 9/2001 | Parr | |
| 6,378,461 B1 | | 4/2002 | Thaler et al. | |

* cited by examiner

*Primary Examiner*—Michael J. Carone
*Assistant Examiner*—Elizabeth Shaw
(74) *Attorney, Agent, or Firm*—Locke Liddell & Sapp LLP

(57) ABSTRACT

A self-cleaning litter box having a base, a litter pan, an upper hood and a lower hood. A rake is used to sweep litter clumps disposed in the litter pan and into a waste box. The rake is inserted and removed without the use of tools in order to clean or replace the rake. Liners inside the litter pan and waste box allow for easy cleaning. In addition, the liners are used to protect against pitting and other potential damage. Sensors detect the presence of a cat inside the litter pan. Upon exit, an actuator receives an output signal for actuating the drive assembly. After a predetermined time delay after receipt of the output signal, the raking cycle commences. The actuator includes a switch to allow the pet owner to vary the length of the pre-determined time delay.

3 Claims, 10 Drawing Sheets

TO FIG 2a

SELF-CLEANING LITTER BOX

CROSS REFERENCE TO RELATED APPLICATION

This application claims the benefit of U.S. Provisional Application Ser. No. 60/373,435 filed Apr. 18, 2002 titled Self-Cleaning Litter Pan.

TECHNICAL FIELD OF THE INVENTION

This invention relates to a litter box, and more particularly, to a self-cleaning litter box for cats.

BACKGROUND OF THE INVENTION

Most domesticated cats are trained to use litter boxes to eliminate solid and liquid wastes. These litter boxes are sized to hold particulate litter that absorbs moisture and suppresses odors from the cat waste. After multiple uses of the litter box by the cat, the pet owner can manually dump the waste and litter particulate from the litter box for disposal.

Because of the unsanitary environment inside the litter box, some pet owners are reluctant to regularly service these litter boxes. In addition, pet owners who frequently travel cannot service these litter boxes on a regular bases. Therefore, various forms of self-cleaning cat litter boxes have been devised for automatically cleaning litter boxes. Many of these devices incorporate a motor driven rake that sifts through the litter pan to carry or push the litter clumps into a separate waste container. Unfortunately, many of these automatic litter boxes remain difficult to clean and oftentimes require more maintenance than traditional (non-automated) litter boxes. For example, over time litter and waste clumps can attach to the rake tines. If litter clumps remain attached to the rake, the litter will harden and decrease the effectiveness of the rake. Further, the additional clumps attached to the rake tines will increase the weight of the rake thereby increasing the load on the motor. As a result, the motor can be damaged. If the motor is battery operated, battery life can be substantially decreased. In addition, because litter clumps remain attached to the rake, undesirable odors will likely result. In order to thoroughly clean the rake, the rake should be detached from the litter box. This usually requires the use of tools, is dirty and requires considerable amounts of time to disassemble and then reassemble.

In addition, many self-cleaning litter boxes can hold only limited amounts of litter. This is especially true of litter boxes incorporating a motor driven rake that sifts through the litter pan. If the litter level inside the pan is too deep, the rake may be unable to sift through the pan and additional power may be required. As a result, if the motor is battery operated, battery life can be considerably decreased and/or a larger motor may be required. In most instances, providing a larger motor is not an option due to space and cost considerations. Furthermore, many present rake configurations are not effectively able to handle deep litter levels because the rake tines lack sufficient strength. Thus, larger tines have been devised to provide additional strength. However, larger tines result in larger surface areas that contact the caustic litter pan environment. This contact can substantially reduce the usable life of the rake. Because cats desire to dig and bury their waste inside the litter, there is a need to overcome the above-mentioned disadvantages in order to provide a deep litter level inside the litter pan.

Finally, many litter boxes, both non-automated and automated, are ineffective in containing litter particulate inside the litter box. When cats enter or exit the litter box, litter particulate is often scattered around the litter box. As a result, the pet owner must manually clean the area around with litter box.

SUMMARY OF THE INVENTION

The present invention relates to a litter box for cats. The liter box is self-cleaning so as to automatically remove waste clumps that form from cat excretions. The self-cleaning litter box comprises a litter pan for holding a predetermined amount of cat litter, a rake for sifting through the cat litter to remove any waste clumps located therein, a drive assembly for moving the rake through the cat litter, and a base member to support the litter pan and contain the drive assembly. A waste box is located adjacent the front wall to store clumps of litter carried by the rake. The litter pan is sized to accommodate multiple cats at one time while also allowing a deep layer of litter to be stored therein. This allows the cats to dig or scratch the litter. A waste box is located adjacent the front wall to store clumps of litter carried by the rake.

During operation, the rake travels through the litter pan to collect waste clumps and to deposit the collected clumps inside the waste box. The rake includes a cross support member to support a plurality spaced apart tines. Each tine is mounted on the support bar at a slight angle and are generally parallel with respect to each other. A pair of rake support arms are located on the ends of the cross member The rake tines are preferably coated with either a chrome, TEFLON® or nylon coating in order to reduce or eliminate pitting and other damage to tines. Further, the coating prevents residue from clumping and remaining attached to the rake after the sweeping cycle. The rake is lightweight so that a greater volume of litter can be stored inside the upper pan without damaging the motor.

A stabilizer bar, mounted in the base, is used to support and transport a rake support structure. The rake support structure is used to support the rake during the sweeping cycle. The rake is easily removed from the litter box in a simple manner and without the use of tools in order to clean or replace as necessary.

The rake is moved across the litter pan by a drive assembly that is preferably contained inside the base and below the litter pan. The drive assembly includes a DC motor that is mounted stationary to the base. The DC motor drives a pair of belts that connect to the stabilizer bar. Thus, when the belts are moved, the stabilizer bar will also move.

Upon activation of the drive assembly, the rake will sift through the litter to collect and push litter clumps toward the waste box. As the rake pushes the clumps toward the waste box, the rake tines push the clumps upward along an inclined ramp. As the rake approaches the waste box, the waste box lid opens so as to receive the waste clumps. After the litter clumps have been deposited inside the waste box, the motor stops and reverses directions so as to return the rake to the rear wall in the same fashion.

The waste receptacle can optionally be fitted with a removable tray and/or a disposable liner so that the waste receptacle can be emptied in an easy manner. In addition, a litter pan liner can be provided to fit inside and to protect the interior of the litter pan. Both liners are provided to add additional protection from the corrosive environment of the waste box and litter pan.

An upper hood and a lower hood are also provided. The lower hood attaches to the base so as to protect the base and drive assembly from litter scatter, cat hair, cat spray, etc.

The upper hood portion attaches to the lower hood portion to provide a cover above the litter pan. The upper hood portion contains a storage compartment located on the top surface to store pet supplies or litter box components such as waste box liners, for example. Additionally, the upper hood portion contains a chamber for housing a filter. A visor portion extends over the waste box to direct odors that are released from the waste box into the upper hood when the waste box is opened. The visor can be detached or retracted when access to the interior is necessary for servicing the litter pan or waste box. After servicing the interior, the visor can be re-attached or expanded so as to be mounted above the waste box.

Rake movement is controlled by sensors that detect the presence of a cat or foreign object in the box. In operation, once the user actuates the present litter box by actuating the on/off switch, a power up sweeping cycle occurs after a preset time delay. The rake moves from the "home" position, adjacent to the rear wall of the litter pan toward the waste box. When the rake approaches the waste box, clumps fall off the rake and into the waste box. The motor and belt drive system reverse directions to return the rake to the home position.

Once the rake is in the "home" position, sensors located in the litter chamber detect the presence of a cat. Once it is determined that the cat has exited the litter chamber, a delay mechanism delays the sweeping cycle until after a sufficient amount of time has passed to permit the litter clumps to harden. If, after rake movement begins, a cat or foreign object enters the litter box, the sensors will detect the presence and the raking action will stop. In addition, if the rake encounters a clump or pile of litter that is too large for the rake to move through the litter box, the rake will return to the home position until the pet owner manually removes the clump.

The delay mechanism provides for setting the cycle delay time after the cat exits the litter chamber. Thus, the pet owner will be able to select the length of the delay time before the sweeping cycle commences in order to allow sufficient time to permit the litter clumps to harden.

DESCRIPTION OF THE PREFERRED EMBODIMENTS

Figure 1:
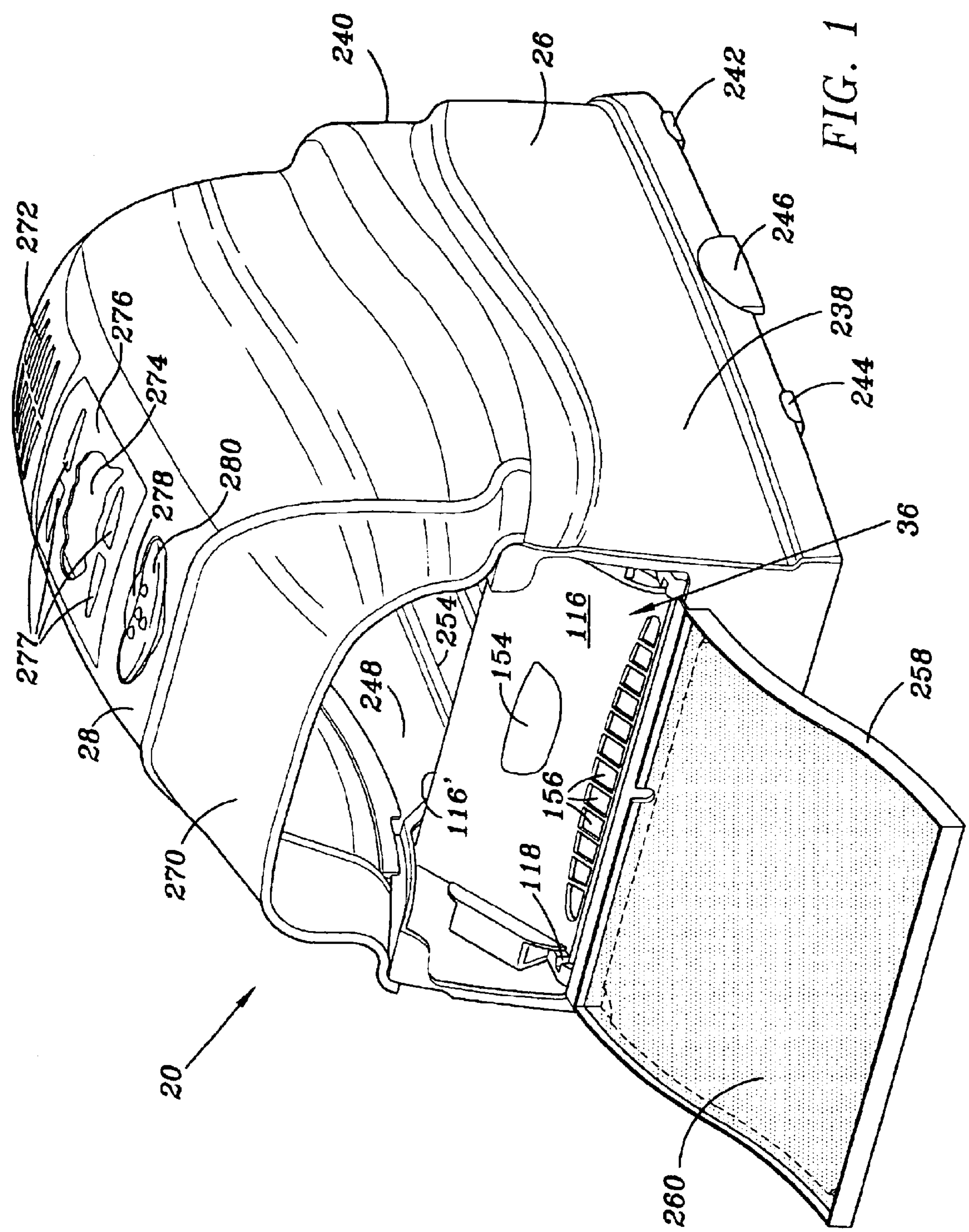
FIG. 1 is a front perspective view of the present invention with the hood covering the litter pan.
Figure 2:
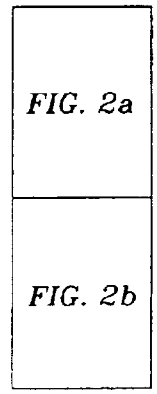
FIGS. 2*a* and 2*b* are an exploded perspective view illustrating the present invention.
Figure 3:
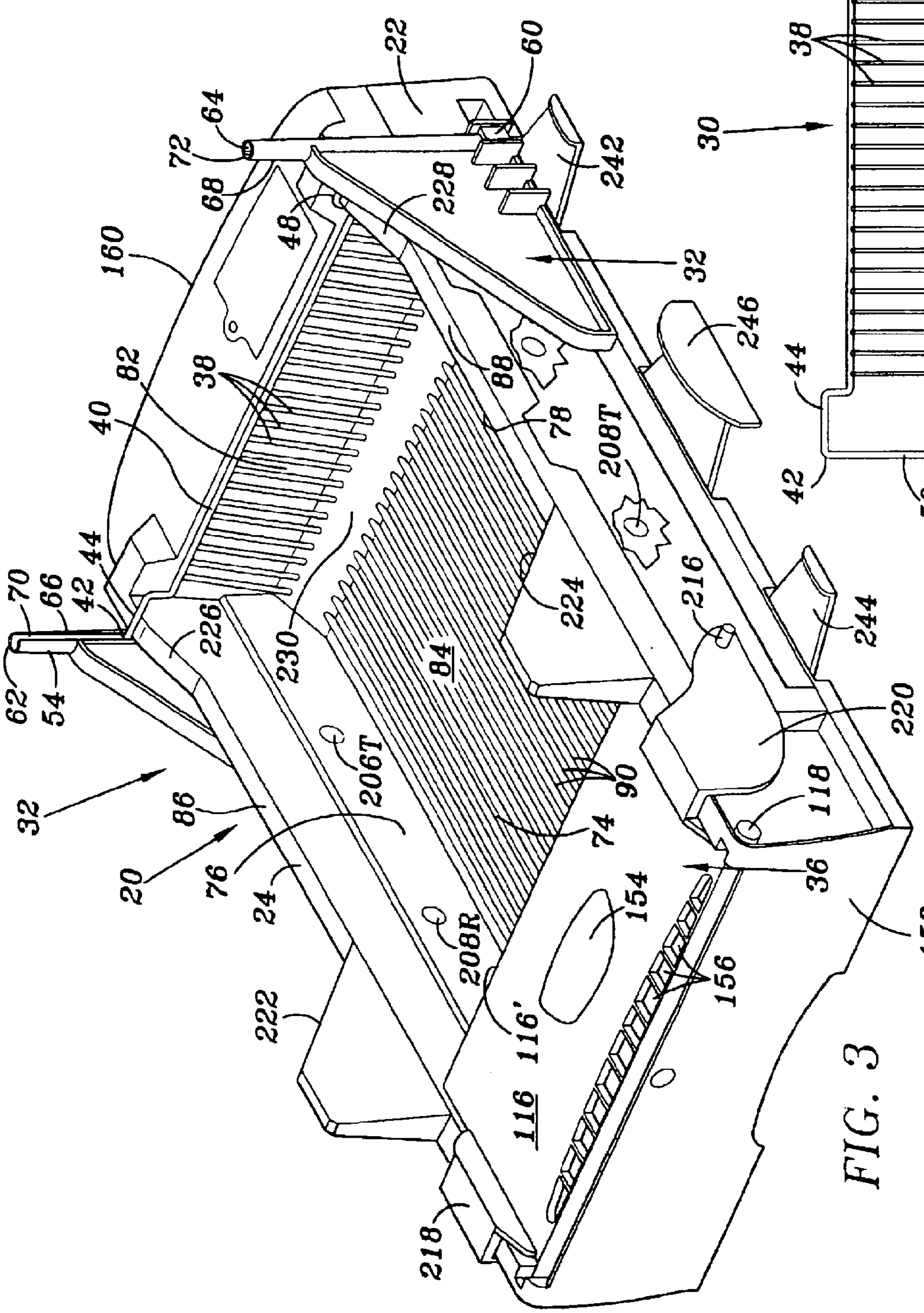
FIG. 3 is a front perspective view of the litter box illustrating the rake in the storage position with the lower and upper hoods omitted.

FIGS. 1–3 illustrate self-cleaning litter box 20. In a preferred embodiment, litter box 20 includes a base 22, a litter pan 24 for holding a supply of litter, a lower hood 26 and an upper hood 28. Litter box 20 further includes a rake 30 disposed in litter pan 24, a rake support assembly 32 to support rake 30, a drive assembly 34 (FIG. 7) to move the rake while installed in the litter pan, and a waste box 36 to receive waste clumps from litter pan 24.

Figure 4:
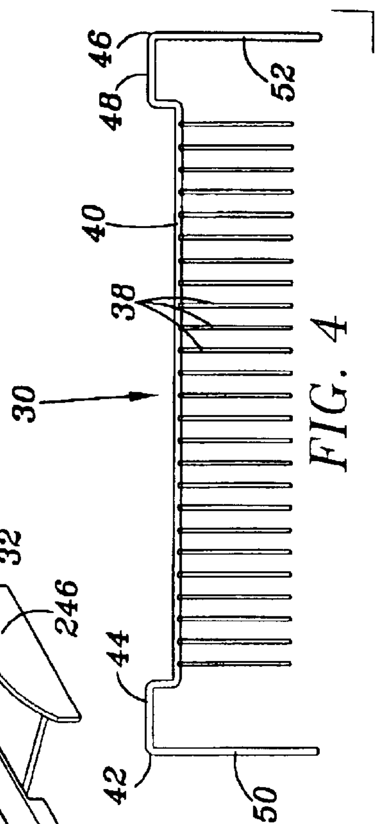
FIG. 4 is a front elevation view of the rake.

Referring to FIGS. 3 and 4, litter pan 20 is illustrated connected to base 22 with lower and upper hoods 26 and 28 removed. Referring specifically to rake 30, rake 30 includes a plurality of tines 38 attached to a cross support bar 40. Cross support bar 40 includes a first end 42 having an offset portion 44 and a second end 46 having an offset portion 48 (FIG. 4) to engage litter pan 24. Cross support bar first and second ends 42 and 46 each contain a rake arm 50 and 52 to support bar 40 when connected to litter box 20. Rake 30 is preferably fabricated from a metal material such as stainless steel. It should be realized by one of ordinary skill that tines 38 can be fabricated from any other material, such as plastic, so long as tines 38 have a sufficient strength to rake through litter pan 24 without being deflected or destroyed. Rake 30 is lightweight in order to reduce the load on the motor (described in detail below). This permits a greater volume of litter to be stored inside litter pan 24 without having to increase to size of the motor. Since cats enjoy scratching and digging the litter, a deep litter level is desirable.

A protective coating may be used to protect tines 38 in order to reduce or eliminate pitting or other damage to tines 38. The coating may include, for example, chrome, nylon, or TEFLON®. Furthermore, the coating acts as a barrier to prevent residue from attaching to the rake during operation. Residue collected on rake tines 38 can increase the weight of the rake, which oftentimes can damage the drive motor or even require additional power to move the rake through litter pan 24. Residue collected on rake tines 38 also prevents the tines from effectively sifting through the litter, causing excess litter to be removed from litter pan 24. In addition, litter will spread unevenly inside pan 24. By having a material that contains a high strength to weight ratio, rake tines 38 can be fabricated smaller to reduce the tine surface area contacting the litter. In a preferred embodiment, tines 38 contain a circular cross section; however, it should be realized by one of ordinary skill that any cross sectional shape can be used including square, oval, teardrop, rectangular, triangular, etc.

Referring specifically to FIG. 3, a rake support 32 supports rake 30 when installed on litter box 20. Rake support assembly 32 includes posts 54 and 56, and post supports 58 and 60. Posts 54 and 56 include end openings 62 and 64 defining entranceways to hollow interiors 66 and 68. Each post 54 and 56 includes a slot 70 and 72, respectively, extending longitudinally along the length of each post to receive cross support bar 40. Rake arms 50 and 52 (FIG. 4) are sufficiently sized so as to slideably engage hollow interiors 66 and 68 respectively. When rake 30 is connected to posts 54 and 56, gravity acts on the rake to keep the rake mounted inside hollow interiors 66 and 68. Rake 30 can be removed from rake support 32 in a simple manner and without the use of tools in order to clean or replace the rake as necessary. To remove rake 30, the rake is lifted so that arms 50 and 52 are removed from posts 54 and 56. Likewise, to install rake 30, rake arms 50 and 52 are aligned with openings 62 and 64 and are inserted therein.

Figure 6:
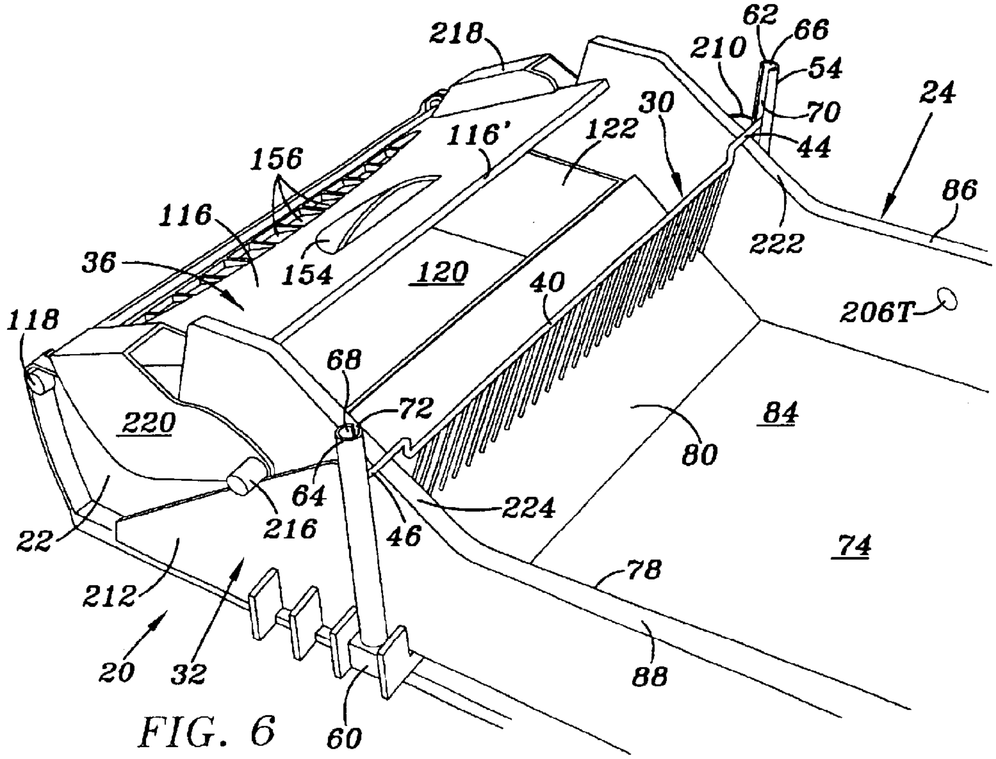
FIG. 6 is a perspective view of the litter box illustrating the rake on the front wall ramp illustrating the waste box lid opening.

As seen in FIGS. 3 and 6, litter pan 24 includes a bottom wall 74 and spaced apart first and second sidewalls 76 and 78, an inclined front wall 80 (FIG. 6) and a rear wall 82, defining a litter chamber 84. Litter pan 24 has an open top to allow cats to enter and exit chamber 84 and is sized to accommodate multiple cats at one time. Each sidewall 76 and 78 contains a planar surface 86 and 88 extending along the top of the sidewalls to support rake cross support member 40 at offset portions 44 and 48 (FIG. 4). As rake 30 sweeps between front and rear walls 80 and 82, the rake is supported by surfaces 86 and 88. Planar surfaces 86 and 88 contain elevated sections 222–228 to raise rake 30 as it travels between front wall 80 and rear wall 82.

Litter pan bottom wall 74 includes strengthening members 90 extending between litter pan front wall 80 and rear wall 82 to provide additional strength to bottom wall 74. Members 90 are preferably ribs integrally molded into bottom wall 74 to prevent warping or sagging. In addition, a shoulder 92 extends along sidewalls 76 and 78. Shoulders 92 are positioned above bottom wall 74 to indicate the litter fill level. Thus, litter can be filled inside chamber 84 until the litter level reaches a height adjacent shoulders 92.

Figure 2A:
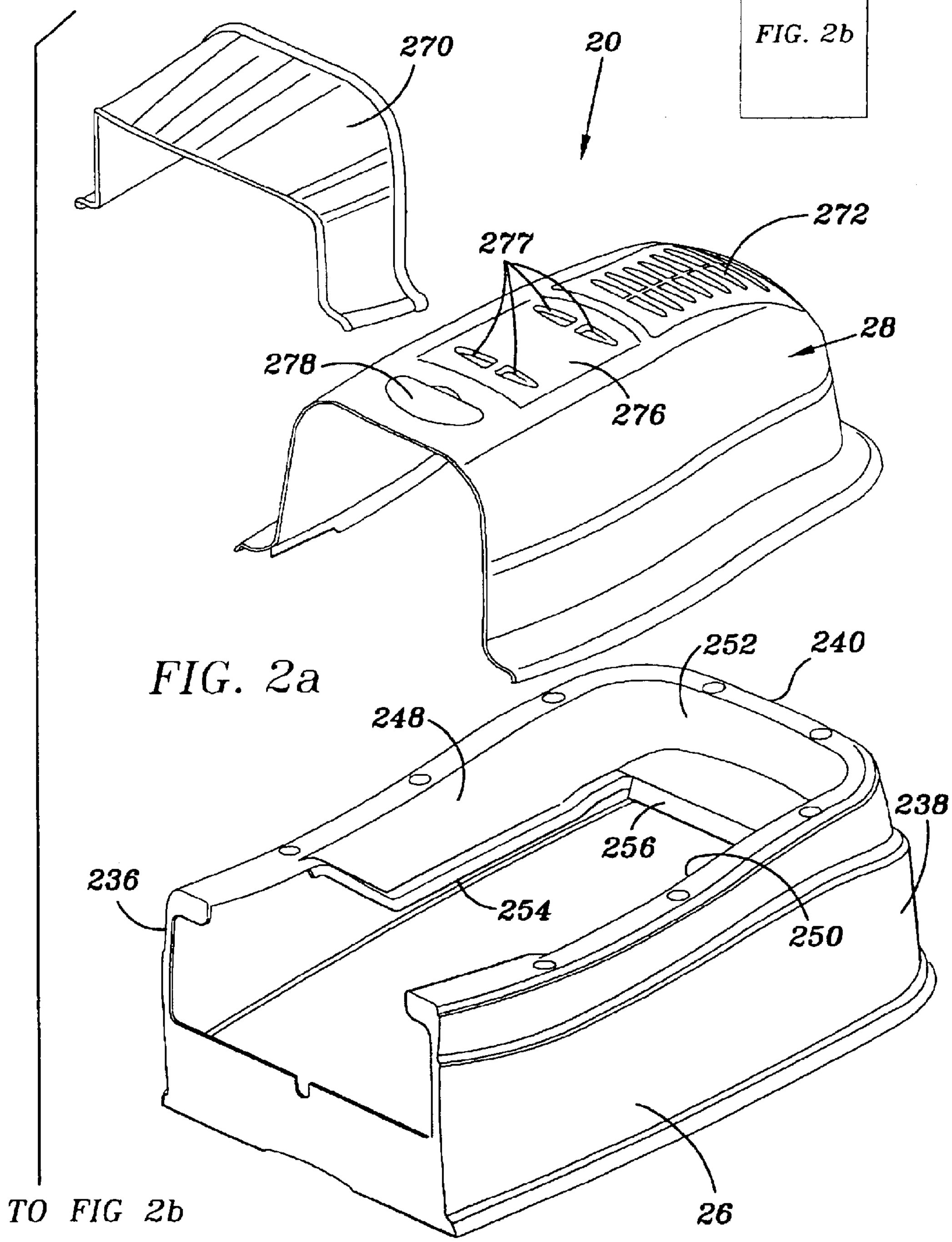
Figure 2B:
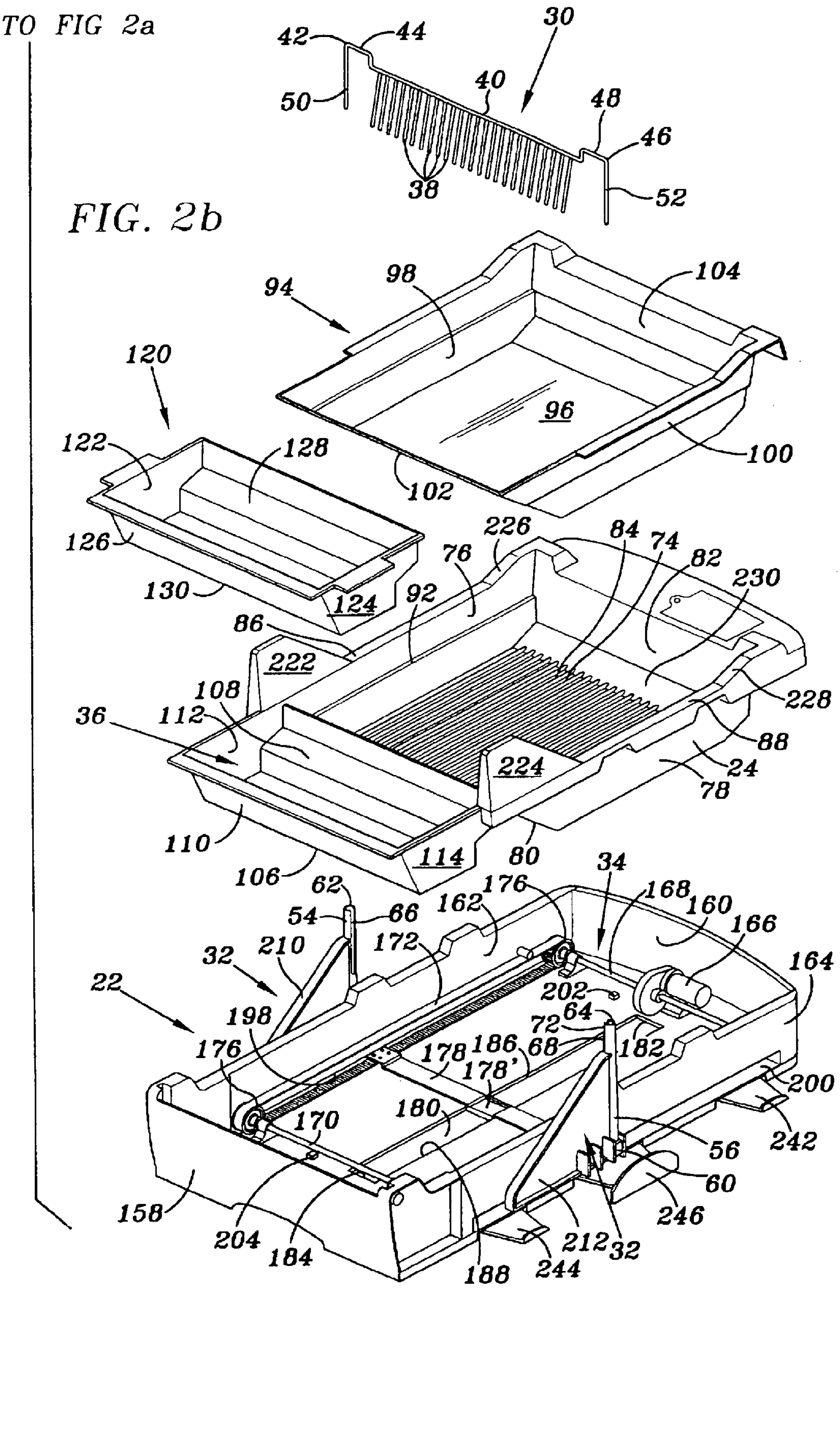

As illustrated in FIG. 2*b*, a pan liner 94 is provided to fit inside and to protect walls 74-82 of litter chamber 84. The liner contains walls 96-104 and is preferably vacuum molded with a poly vinyl chloride (PVC) material. However, other materials may be used including those having biodegradable polylactide. Typical prior art litter pan liners are fabricated from a polyethylene bag. These bags are typically attached loosely to the litter boxes and, if used in conjunction with a raking system, the bag can become tangled with the rake tines. A molded liner provides advantages over polyethylene liners because molded liners will not tangle with rake tines 38. In addition, as cats scratch and dig, the polyethylene liner may become rearranged. By using liner 94, the pet owner can keep the litter box clean without having to expose litter box 20 to soap, water or other moisture that might damage the electrical components. Also, the vacuum formed liner 94 for litter pan 24 prevents walls 74–82 from being scratched and worn from the constant movement of the abrasive litter materials. If walls 74–82 become scratched, the walls will tend to hold odor and waste.

Referring to FIGS. 2*b* and 6, waste box 36 can be seen. Waste box 36 is located adjacent litter pan front wall 80 and contains a bottom wall 106, a rear wall 108, a front wall 110, a pair of sidewalls 112 and 114 and a lid 116 pivotably mounted to hinge 118. As seen in FIG. 2*b*, waste box 36 and litter pan 24 are illustrated as being integrally molded as one piece; however, it should be realized by one of ordinary skill that waste box 36 can be a separate component attachable to litter pan 24. As will be explained in greater detail below, as rake 30 travels upward along inclined wall 80 (FIG. 6), lid 116 pivotably opens so that litter clumps (not shown) collected by rake 30 during the raking cycle can be deposited inside waste box 36. Once the litter clumps are deposited inside waste box 36, the rake returns to rear wall 82 and lid 116 closes to seal any odors from the surrounding area.

As illustrated in FIG. 2*b*, waste box 36 can optionally include an inner tray 120 that is removable when cleaning or servicing the waste box. Inner tray 120 includes sidewalls 122 and 124, end walls 126 and 128 and a bottom wall 130. Inner tray 120 is configured to be inserted inside waste box 36.

Figure 11:
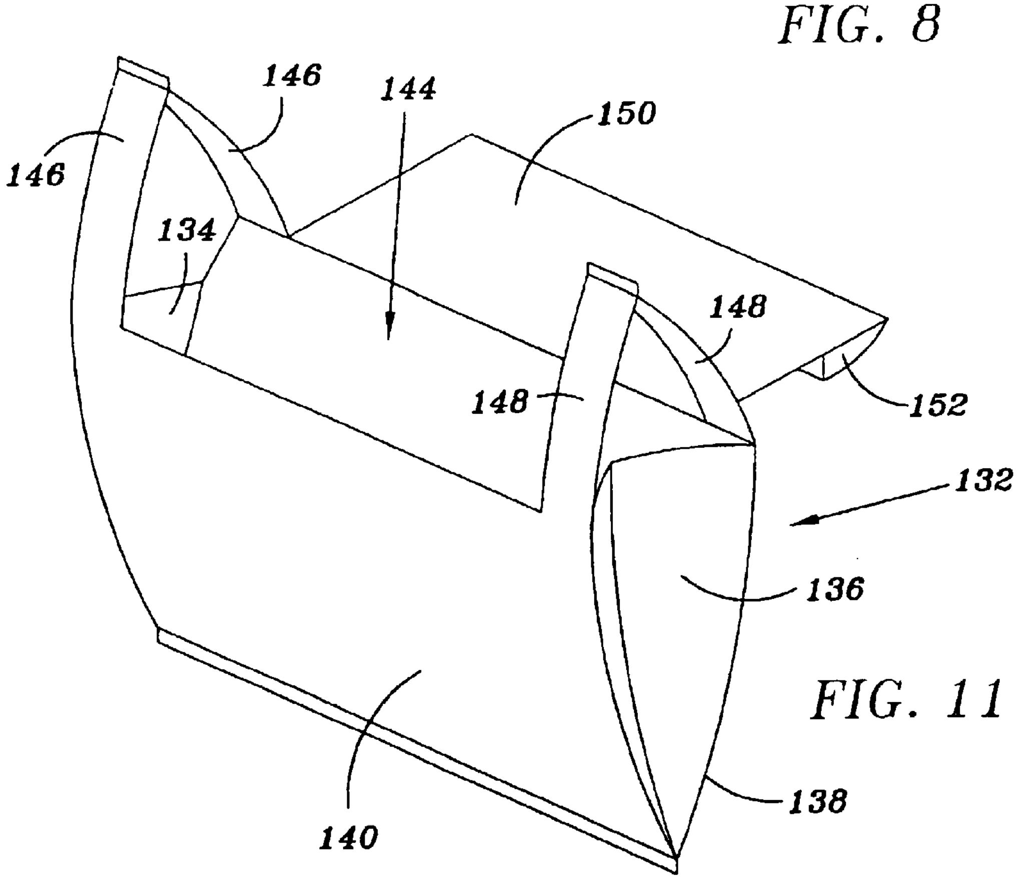
FIG. 11 is a perspective view of the waste box liner.

A disposable waste box liner 132, as illustrated in FIG. 11, can be optionally used to protect inner tray 120, or, if waste box 36 is being used without tray 120, liner 132 can be used to protect waste box walls 106–114. Disposable liner 132 contains pleated sidewall portions 134 and 136 and end walls 138 and 140 to form a pocket 144 to receive and hold waste clumps. End walls 138 and 140 each contain a strap or handle 146 and 148. A top wall or flap portion 150 is also included and is sized to connect and to protect the underside of waste box lid 116 from dirt and waste. Flap portion 150 is substantially the same dimension as lid 116 and contains a pocket 152 along the length of the bag to attach to lid edge 116'.

During installation of waste box liner 132, handles 146 and 148 allow the user to open the bag so that pleated sidewalls 134 and 136 can open to conform to the width of inner tray 120, or waste box 36, if tray 120 is not being used. Sidewalls 134 and 136 and handles 146 and 148 are designed to tuck in and around inner tray 120 after waste box liner 132 is installed.

When removing liner 132 from waste box 36, waste box lid 116 is opened using a handle 154 (best seen in FIG. 6). Flap 150 is then disconnected from lid 116 and flap 150 is used to cover pocket 144. As discussed in further detail below, any litter particulate that may exist between lid 116 and flap 150 will act to hold down the flap over pocket 144 to contain odors inside the pocket. Disposable liner 132 can be removed from waste box 36 by handles 146 and 148. Upon removal, handles 146 and 148 can then be used to further seal pocket portion 144 by tying the handles together. The liner is a plastic bag, preferably fabricated from polyethylene or a polypropylene material.

When closed, waste box lid 116 serves as a step or platform to allow the cat to enter litter chamber 84. After the cat exits waste box 20, any litter particulate that is attached to the cat's paws may eventually collect on waste box lid 116. To prevent litter particulate from sliding off lid 116 and onto the surrounding floor when lid 116 pivotally opens, waste box lid 116 contains openings 156 to receive the litter particulate. Thus, as lid 116 opens during the raking cycle (FIG. 6), any litter particulate that has settled on lid 116 will slide toward openings 156 and into waste box 36, instead of scattering on the surrounding floor.

Figure 7:
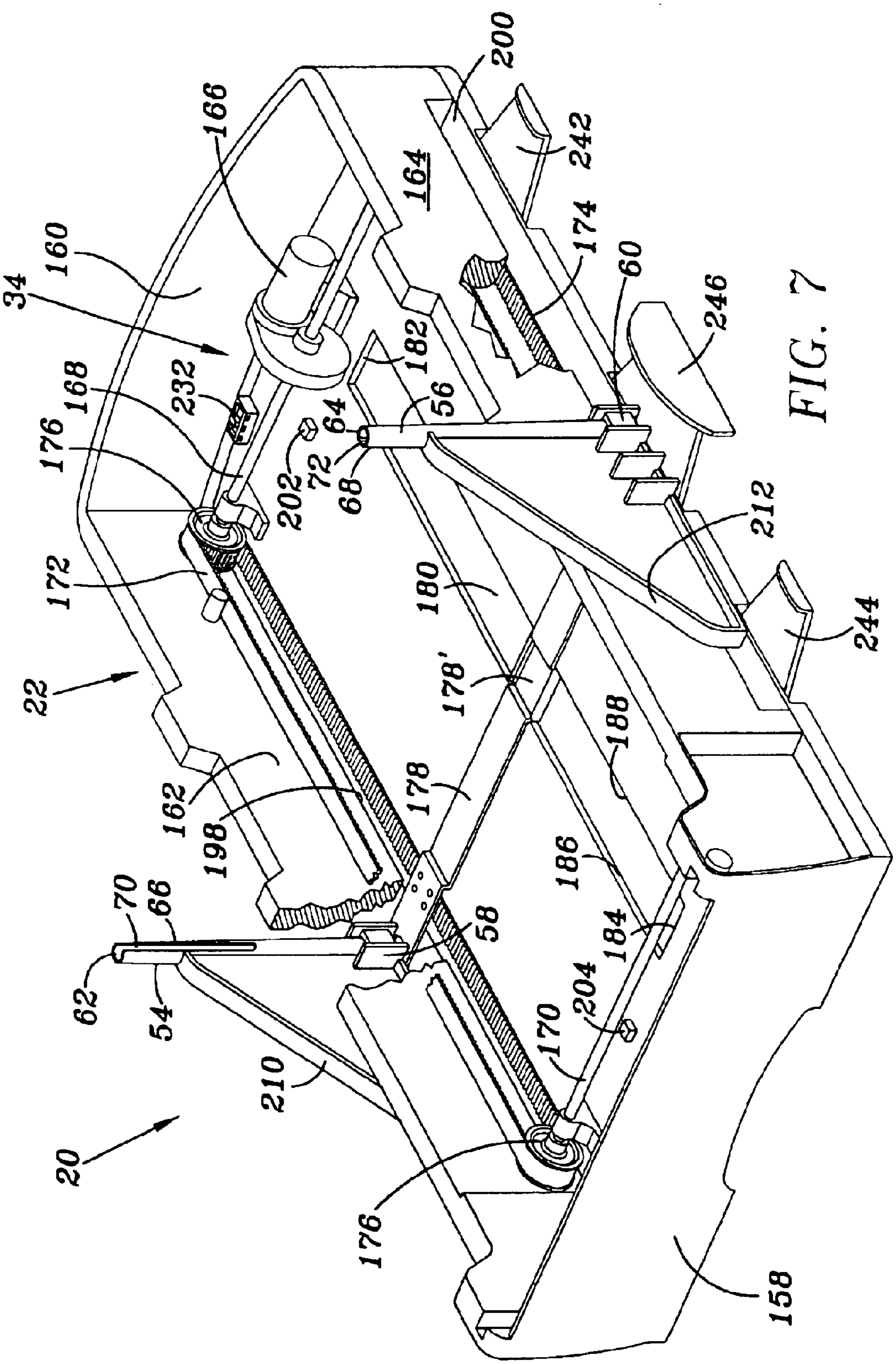
FIG. 7 is a front perspective view illustrating the base pan and drive assembly.

Referring to FIG. 7, base 22 and drive assembly 34 can be seen. Base 22 includes a front wall 158, a rear wall 160, and a pair of sidewalls 162 and 164 to house drive assembly 34. In a preferred embodiment, litter pan 24 rests above and is supported by base 22. Litter pan 24 covers and encloses drive assembly 34 to insulate operational noises during the raking cycle which also preventing injury to animals or pet owners. In addition, the litter inside litter chamber 84 insulates the noise produced during the raking cycle.

Drive assembly 34 includes an electric motor 166, a first shaft 168 connected to a second shaft 170 by belts 172 and 174. A belt and pulley system includes belts 172 and 174 that are supported by pulleys 176 located on opposed ends of shafts 172 and 174. While only pulleys 176 are illustrated attached to belt 172, it should be realized by those of ordinary skill that the identical configuration can be seen in mirror image on belt 174. A stabilizer bar 178 attaches to belts 172 and 174 so as to be moved by the belts between walls 158 and 160. In this configuration, both ends of stabilizer bar 178 travel at exactly the same rate. Stabilizer bar 178 connects to rake post supports 58 and 60 and is operable to move between base front wall 158 and rear wall 160. In operation, motor 166 drives first shaft 168 that in turn rotates pulleys 176 to move belts 172 and 174. Motor 166 is a standard DC motor that can be powered by batteries or by standard household electricity.

Base 22 includes a groove 180 having groove endwalls 182 and 184 and groove sidewalls 186 and 188. Groove 180 extends parallel to base sidewalls 162 and 164 and between base front and rear walls 158 and 160. Groove 180 is sufficiently sized to receive an offset portion 178' of stabilizer bar 178 so that as stabilizer bar 178 travels between front wall 158 and rear wall 160, offset portion 178' travels inside groove 180. Groove sidewalls 186 and 188 prevent stabilizer bar 178 from movement in the lateral direction between base sidewalls 162 and 164.

The ends of stabilizer bar 178 extend through slots 198 and 200 and are adapted to connect to rake post supports 58 and 60. Thus, when rake supports 58 and 60 are connected to stabilizer bar 178, the stabilizer bar moves rake 30 (when installed) between litter pan front wall 80 and litter pan rear wall 82.

During the raking cycle, stabilizer bar 178 is transported from base rear wall 158 toward forward wall 160 until stabilizer bar triggers a relay 202. Once relay 202 is triggered, a signal is sent to a microprocessor (not shown) which in turn sends a signal to motor 166 to reverse the direction of stabilizer bar 178 in the direction of base rear wall 158. If however, relay 202 fails, offset portion 178' will contact groove end wall 182 to prevent the stabilizer bar from traveling further and potentially damaging other components, such as shaft 168 Likewise, as stabilizer bar nears base rear wall 158, stabilizer bar 178 will trigger relay 204 to send a signal to shut off motor 166. If relay 204 fails, offset portion 178' will contact groove end 184 so as to prevent further movement of stabilizer bar 178.

Figure 8:
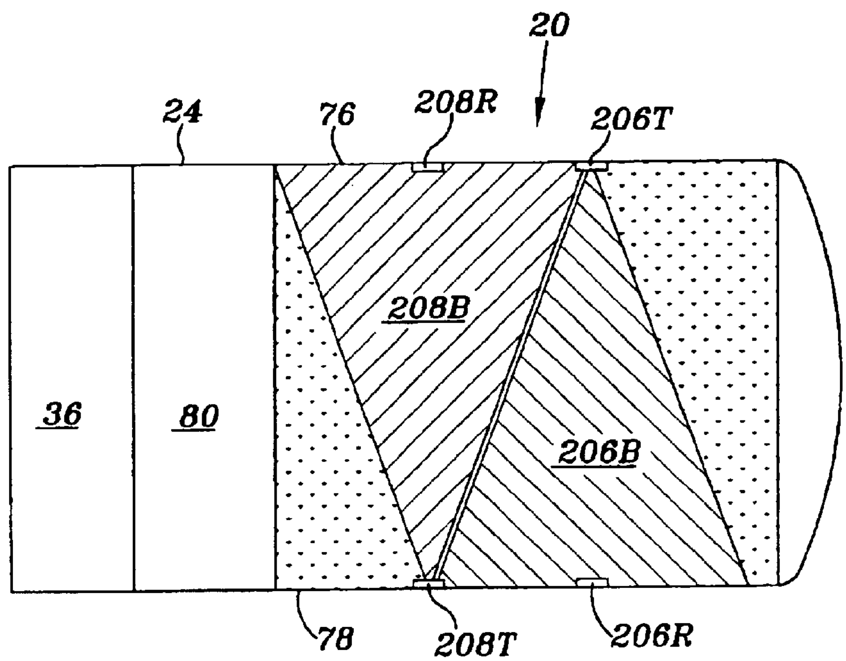
FIG. 8 is a top plan view of the litter pan illustrating the sensor placement.

Referring to FIGS. 3, 4 and 8, rake movement is partially controlled by sensors 206 and 208 that detect the presence of a cat or foreign object in the box. Sensors 206 and 208 preferably include infrared photocell detectors that detect when a beam has been disturbed or broken. Sensors 206 and 208 each include a transmitter designated by the letter "T" and a detector or receiver, designated by the letter "R". As illustrated in FIG. 8, transmitter 206T and receiver 208R are disposed along litter pan sidewall 76. A receiver 206R is also disposed along litter pan sidewall 78 and is aligned with transmitter 206T. Transmitter 208T is disposed on sidewall 78 opposite receiver 208R. Receivers 206R and 208R, which detect signals generated by transmitters 206T and 208T, operate to detect the presence of a cat or a foreign object within the litter chamber 84. It should be realized by one of ordinary skill that a greater or fewer number of photo cell detectors can be used if litter chamber 24 is larger or smaller.

Transmitters 206T and 208T are disposed on opposite sidewalls 76 and 78 to prevent transmitter 206T from interfering with receiver 208R and to prevent transmitter 208T from interfering with receiver 206R. In this configuration, transmitter 206T is independent of transmitter 208T; therefore, when rake 30 enters the beam spread area 206B for transmitter 206T, transmitter 208R will remain operable to detect cats or other obstructions. The same is true when rake 30 enters beam spread area 208B. In order to permit the litter pan sensors to detect objects in the widest area inside litter chamber 84, transmitters 206T and 208T are spaced apart so that beam spread areas 206B and 208B are adjacent each other or have minimal overlap, as seen in FIG. 8.

Figure 5:
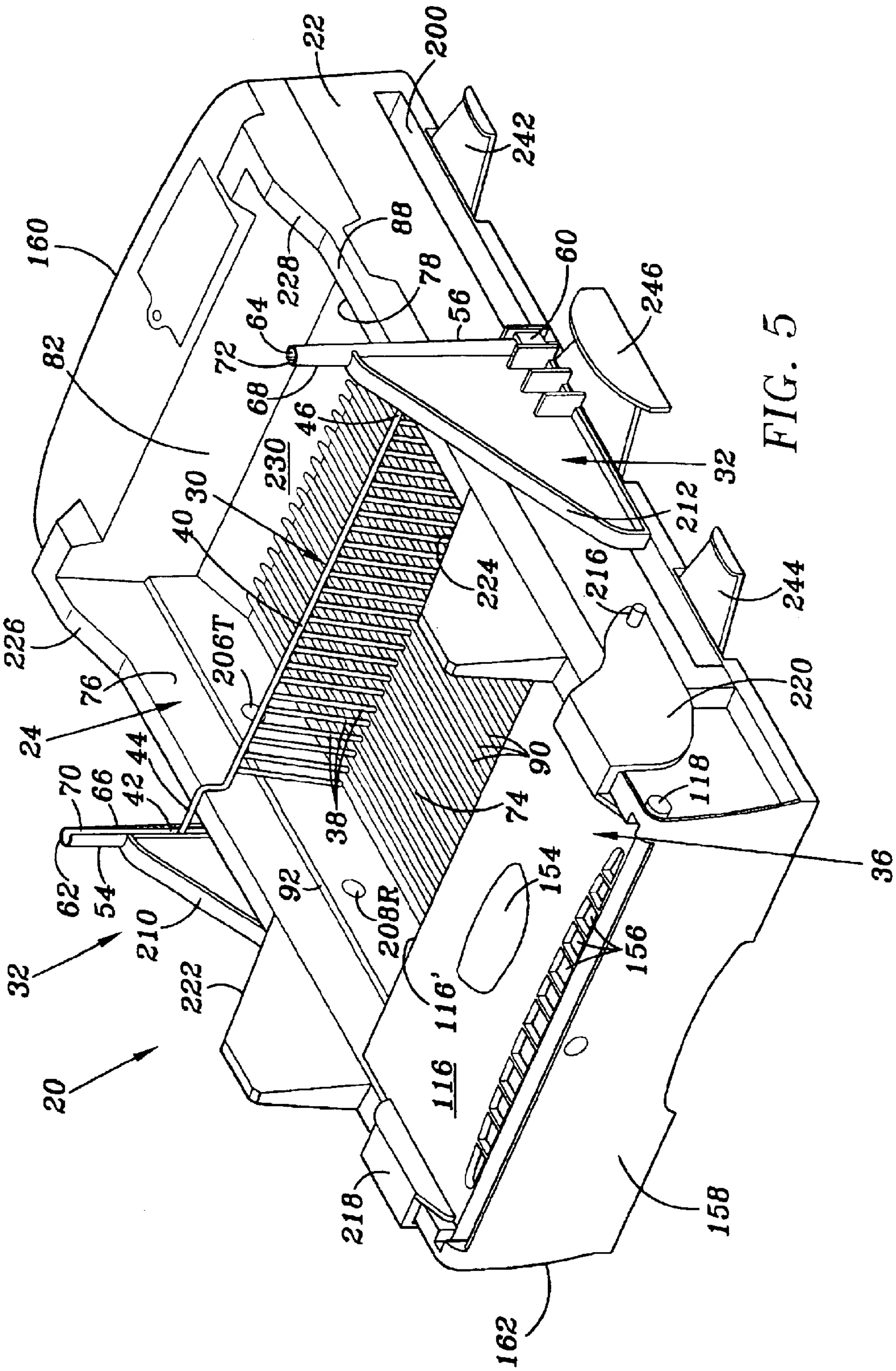
FIG. 5 is a front perspective view of the litter box illustrating the rake disposed in the litter pan between the front and rear walls.

In operation, the user supplies power to litter box 20 by actuating an on/off switch (not shown). An initial "power up" rake sweep cycle begins after a set time delay. Rake 30 begins the sweep cycle by moving from the "home position," located adjacent litter pan rear wall 82 (FIGS. 3 and 9), and continuing through the middle portion of litter chamber 84 (FIGS. 5 and 9) toward inclined front wall 80. During this time, any litter clumps (not shown) present in litter chamber 84 are pushed toward inclined front wall 80. Once rake 30 reaches inclined front wall 80, rake 30 pushes the litter clumps (not shown) upward along inclined front wall 80, as best seen in FIG. 6. As rake 30 travels upward along inclined wall 80, lid ramps 210 and 212 engages rollers 214 and 216, located on ear ears 218 and 220. Ears 218 and 220 are attached to waste box lid 116 so that as rollers 214 and 216 travel upward along lid ramps 210 and 212, lid 116 will pivotably open. During this time, cross member 40 is pushed upward by planar surface ramps 222 and 224 so that rake arms 50 and 52 (FIG. 4) raise inside and slideably engaged hollow interiors 66 and 68. As rake 30 travels to the uppermost portion of inclined wall 80 and planar surface ramps 222 and 224, the litter clumps will fall off rake 30 into the waste box 36. Movement of rake 30 is terminated at the top end of inclined front wall 80 when the position of stabilizer bar 178 is detected by relay 204 (FIG. 7). When relay 204 is triggered, a signal is sent to a microcontroller which in turn sends a signal to motor 166 to reverse directions to move rake 30 to the "home" position (FIG. 3). Upon approaching litter pan rear wall 82, movement of rake 30 is terminated when the stabilizer bar position is detected by relay 202 (FIG. 7).

Figure 9:
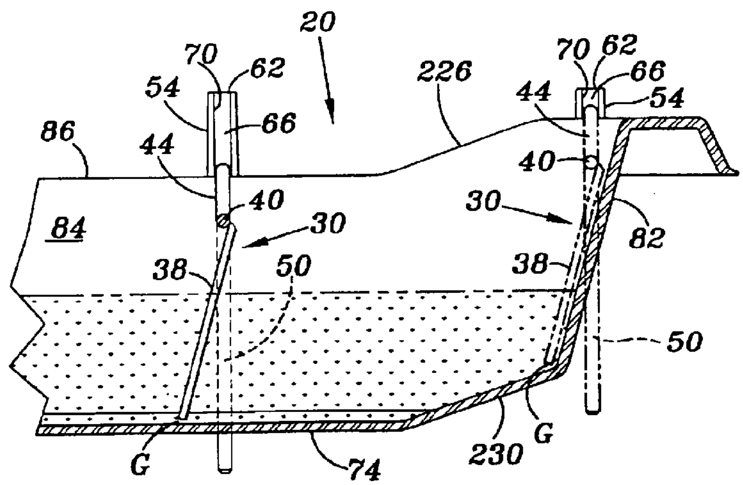
FIG. 9 is a side view of the rake disposed inside the litter pan showing the angled rake tines.

As seen specifically in FIG. 9, tines 38 are angularly disposed with respect to rake arms 50 and 52. This angled configuration permits the waste clumps to gravitally fall from rake 30 into waste box 36.

Referring back to FIG. 3, sidewall planar surfaces 86 and 88 include ramps 226 and 228 which are inclined to lift rake 30 upward as the rake approaches litter pan rear wall 82. In addition, litter pan bottom wall 74 includes a ramp 230. This configuration ensures that rake 30 can continue to travel to and from the home position to overcome the natural buildup of litter that occurs adjacent rear wall 82. Litter buildup occurs as a result of rake 30 traveling to the "home" position. In addition, at the commencement of the raking cycle, the inclined planar surface ramps 226 and 228 and bottom wall ramp 230 enable rake 30 to gradually dig "down" into the litter as rake 30 travels toward inclined front wall 80 along ramp 230. Ramps 226 and 228 are sufficiently sized to raise rake 30; however, tines 38 still remain below the top surface of the litter level.

After the initial power up sweep, as described above, litter box 20 is ready for use. When the cat enters litter chamber 84, sensors 206 and/or 208 detect the presence of the cat. Once sensors 206 and/or 208 detect that the cat has exited litter chamber 84, a signal is sent to a timer to delay the commencement of the sweeping cycle after a predetermined delay period. A switch 232 (FIG. 7) can be optionally provided to allow the pet owner to determine the predetermined length of the delay period before commencing the sweeping cycle. In a preferred embodiment, switch 232 is a three position switch that allows the pet owner to set the delay period for either ten, fifteen or twenty minutes as some litter clumps require different time lengths to sufficiently harden before being swept by rake 30. In the alternative, a remote control 280 (FIG. 1) can include a switch 232 to permit the pet owner to select the predetermined delay period. When the delay period expires, sensors 206 and 208 confirm that no cat or foreign object is present in litter chamber 84. If a cat or foreign object is detected, raking operation will not start. If no cat or foreign object is detected, rake moves forward until reaching waste box 36. Upon reaching waste box 36, rake 30 stops to permit the litter clumps to fall inside waste box 36. After a short period of time elapses, rake 30 then reverses directions, as previously described, and returns to the "home" position (FIG. 3). During the raking cycle, sensors 206 and 208 continue to detect whether a cat or foreign object has entered litter chamber 84. If, during the raking cycle, a cat or foreign object is detected, the raking sequence stops until the cat or foreign object is no longer in litter chamber 84.

A motor load sensor (not shown) will detect if rake 30 encounters a waste clump or pile of litter that is too great to be moved by the rake. Motor load sensor operates by monitoring the load on motor 166 such that when the load across the motor reaches a predetermined value, a signal will be sent to the microcontroller which in turn sends a signal to reverse the direction of motor 166 to return rake 30 to either litter pan front wall 80 or litter pan rear wall 82, whichever is in the reverse direction of the path. Rake 30 will then reverse direction and travel toward the waste clump in an additional attempt to move the clump. If after multiple attempts the clump cannot be moved, the pet owner will be alerted that litter box 20 requires maintenance.

As can be best seen in FIG. 9 rake tines 38 extend downward and are located adjacent bottom wall 74. A slight gap G extends between tines 38 and bottom wall 74 to prevent rake from scratching floor 74. However, gap G should be a minimal distance so as to prevent litter clumps from remaining inside the bottom of litter chamber 84.

Figure 10:
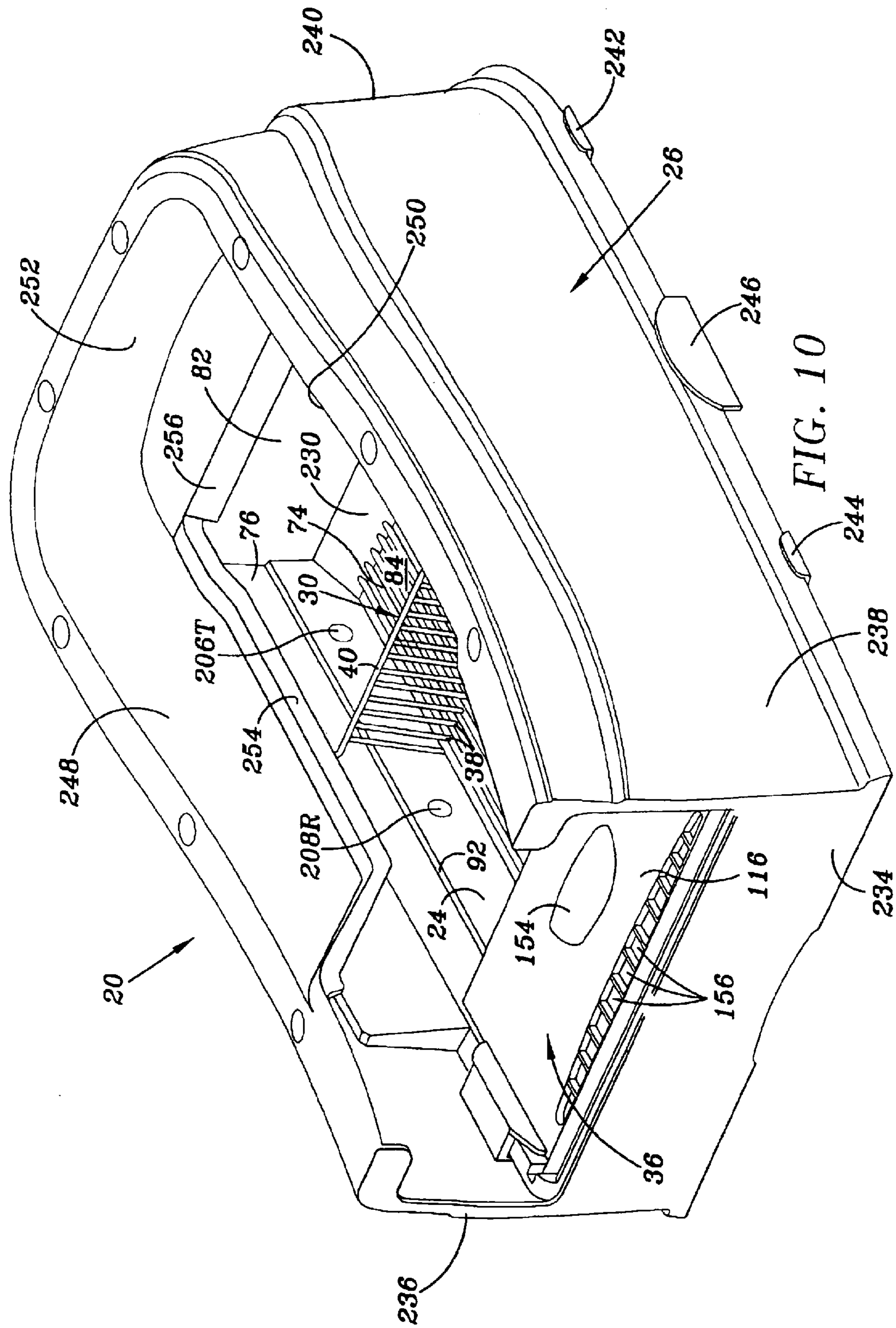
FIG. 10 is a front perspective view illustrating the pan and lower hood spray proof rim.

As seen in FIG. 10, lower hood 26 is installed to surround litter pan 24. Hood 26 includes a forward wall 234, a pair of sidewalls 236 and 238, and a rear wall 240 to surround and protect litter pan 24 and base 22. Lower hood 26 is mounted on hood supports 242 and 244 and is locked to base 22 with latch 246 (additional hood supports 242 and 244 and latch 246 are also located in mirror image along sidewall 236).

As can be seen, lower hood sidewalls 236 and 238 conceal rake supports 58 and 60, posts 54 and 56, and lid ramps 210 and 212. By concealing these moving elements, the litter box 20 is maintained clean and better protected from litter, cat hair, spray, etc.

Interior sidewalls 248 and 250 and rear wall 252 are a sufficient height above litter pan 24 to protect the areas surrounding the litter pan from litter scatter and cat spray. In addition, a rim 254 extending along interior walls 248 and 250 cover cross member offset portions 44 and 48 (offset portions best seen in FIG. 4). A rim 256 also extends along rear wall 252. Rims 254 and 256 reduce spray and litter scatter that may damage the moving elements described above.

In addition to reducing litter scatter and spray, rims 254 prevent rake 30 from rising above and separating from planar surface 86 and 88. During the raking cycle, rake 30 tends to rise up as it moves through the litter. Thus, the shape of rims 254 correspond to the shape of planar surfaces 86 and 88 and are sufficiently spaced apart such that cross support bar offset portions 44 and 48 can be placed between rims 254 and planar surfaces 86 and 88. This prevents rake 30 from rising above planar surfaces 86 and 88 during the raking cycle. Latches 246 are used to secure lower hood 26 to base 22 to prevent rake 30 from pushing hood 26 upward.

When it is desired to remove rake 30 from litter box 20, lower hood 26 is detached from base 22 by unlocking latches 246. Once unlocked, lower hood 26 is lifted away from base 22 thereby exposing rake offset portions 44 and 48 being connected to rake supports 32. As previously explained, rake 30 is lifted so that arms 50 and 52 are removed from posts 54 and 56. To install rake 30 in litter box 20, rake arms 50 and 52 are aligned with openings 62 and 64 and inserted therein. Hood 26 is then re-attached to base 22 and locked by latches 246.

Figure 12:
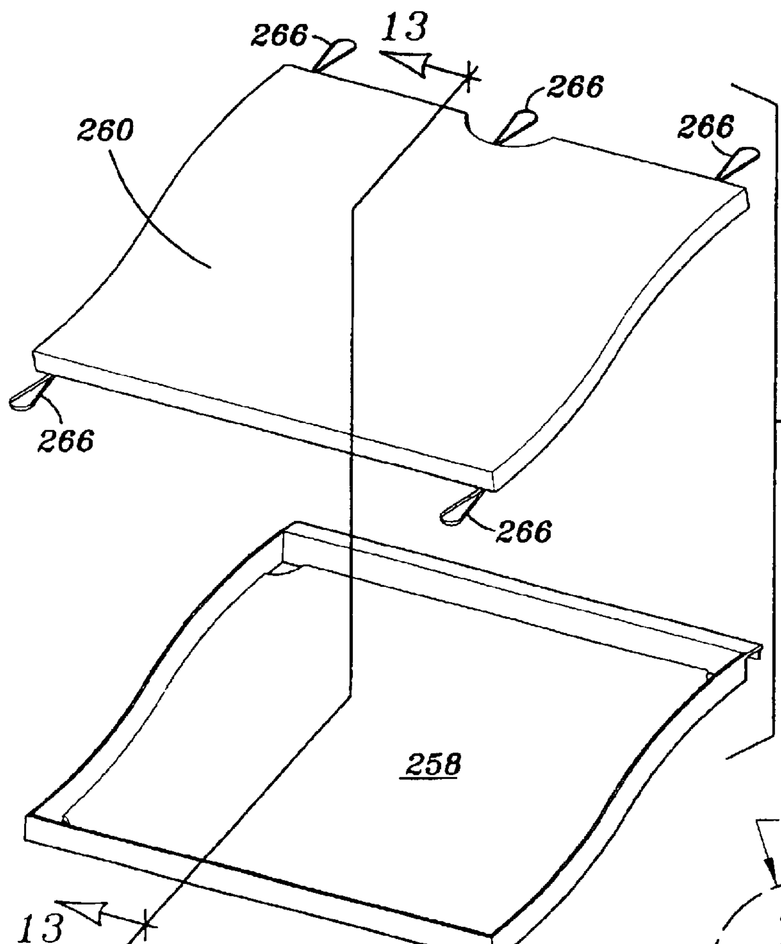
FIG. 12 is an exploded perspective view of the ramp and ramp rug.

As seen in FIGS. 1 and 12, an entrance ramp 258 can be attached to litter box 20 to allow a cat to easily enter and exit litter chamber 84. Ramp 258 is removable such that litter box 20 can be used with or without the ramp. A rug 260 can be used to overlay ramp 250 to catch any litter that is spread when the cat exits litter chamber 84.

Figure 13:
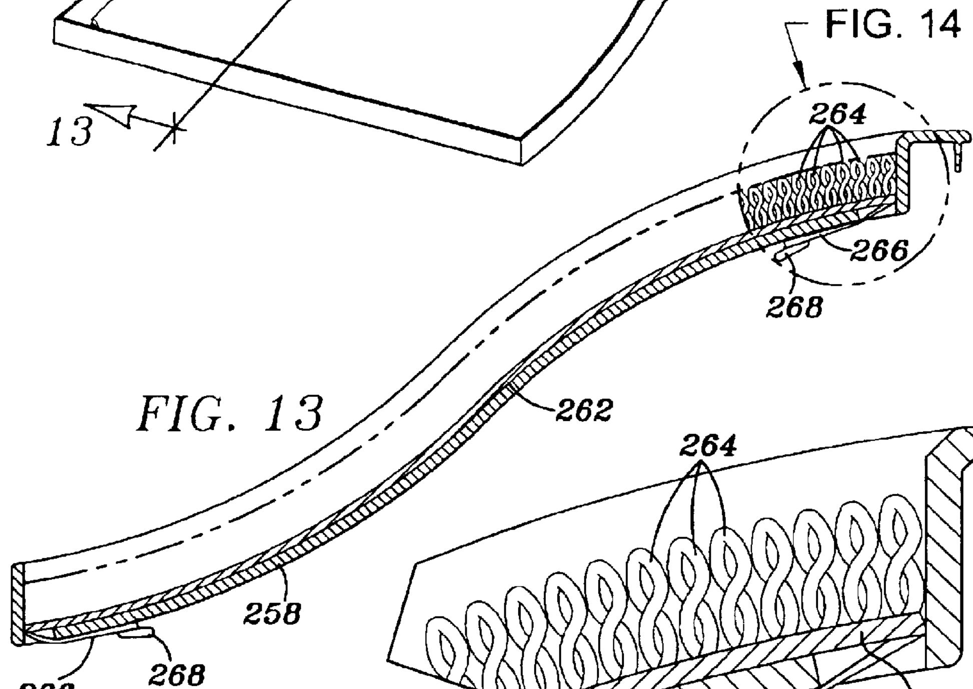
FIG. 13 is a section view of the ramp and rug of FIG. 12 taken along the line 13-13.
Figure 14:
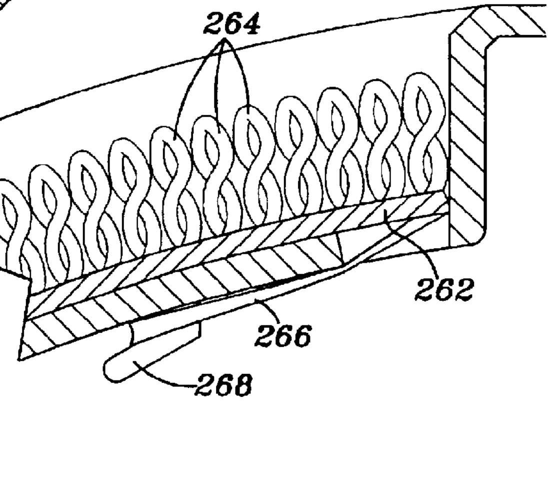
FIG. 14 is an enlarged view of the rug of FIG. 13.

Referring to FIGS. 13 and 14, rug 260 includes a backing layer 262 and a twisted fabric loop material 264 attached the backing layer. Twisted fabric loop material 264 is preferably a twisted cotton loop that is approximately 1-1.25 inches in length. Twisted loops 264 are spaced apart such that litter can be trapped between each fabric loop material 264. This prevents litter from scattering on the surrounding floor area. Alternatively, twisted fabric loop material 264 may be substituted for twisted, but non-looped material, if desired.

Rug backing 262 contains a plurality of elastic loops 266 (FIG. 12) attached to backing 262 so that rug 260 can be easily attached to hooks 268 on ramp 258. In addition to being attachable to ramp 258, rug 260 can be sufficiently sized overlay the floor area surrounding or adjacent to litter box 20. Multiple sections can be attachable together, using a hook and pile fastener for example, to protect the surrounding areas.

Referring back to FIGS. 1 and 2*a*, upper hood 28 is used to cover litter pan 20. It should be realized by one of ordinary skill that litter box 20 can be used without upper hood 28 if it is desired to operate as a "non-hooded" or an "open" litter box. Hood 28 includes a removable visor portion 270 located above waste box 36. Visor portion 270 extends over waste box 36 so that as waste box lid 116 opens, odors will be directed by visor portion 270 into hood 28. A filter 272 is mounted to hood 28 toward the rear portion of litter box 20. Thus, odors that rise from litter chamber 84 or those that are released from waste box 36, when open, can be filtered by filter 272. The filter is most preferably a polyester substrate with charcoal and zeolite particles stored in a polyethylene bag.

Visor portion 270 can be completely detached from hood 28 (as seen in FIG. 2*a*) to allow access to waste box 36 without detaching hood 28 entirely from litter box 20. In the alternative, visor portion 270 can be pivotably mounted to hood 28 so that it remains attached at all times; thus when it is desired to access waste box 36, visor portion 270 can be pivotably opened. Visor portion 270 is preferably fabricated from a translucent or transparent, but slightly tinted material, so that the consumer can view litter chamber 84 while also providing the cat sufficient privacy.

In addition, hood 28 includes a storage compartment 274 that is sized to receive and store pet supplies such as replacement waste box liners. Storage compartment 274 contains a lid 276 that can be opened for easy access inside storage compartment 274. The pet owner can remove lid 276 to gain access inside interior 274 by using finger grips 277 to completely lift lid 276 away from hood 28. Hood 28 also can optionally include a storage compartment or receiving area 278 for holding remote control 280 (FIG. 1) to operate litter box 20.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A litter box comprising:

a chamber having a bottom wall, spaced apart front and rear walls and first and second sidewalls for retaining a supply of litter;

a first sensor for detecting an obstruction in said litter chamber, said first sensor having a transmitter and a receiver wherein said transmitter generates an output signal that is detected by said receiver, said transmitter being disposed on said first sidewall and said receiver being disposed on said second sidewall;

said first sensor transmitter output signal generating a triangular shaped beam spread area extending from said first sidewall to said second side wall;

a second sensor spaced apart from said first sensor for detecting an obstruction in said litter chamber, said second sensor having a transmitter and a receiver wherein said transmitter generates an output signal that is detected by said receiver, said transmitter is disposed on said second sidewall and said receiver is disposed on said first sidewall;

said second sensor transmitter output signal generating a triangular shaped beam spread area extending from said second sidewall to said first sidewall; and said beam spread area generated by said first sensor transmitter being disposed adjacent to and non-overlapping with said beam spread area generated by said second sensor transmitter, such that said first and second sensors operate independently of each other for separately detecting obstructions in said beam spread areas.

2. The litter box of claim 1 wherein said first and second transmitters each generate an infrared output signal.

3. The litter box of claim 1 wherein said first and second receivers are infrared photocell detectors.

* * * * *